United States Patent
Sugiyama

(10) Patent No.: US 6,313,886 B1
(45) Date of Patent: Nov. 6, 2001

(54) AUTOMATIC PSIP DETECTION SYSTEM AND METHOD

(75) Inventor: Osamu Sugiyama, Tama (JP)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/282,983

(22) Filed: Mar. 31, 1999

Related U.S. Application Data

(60) Provisional application No. 60/104,219, filed on Oct. 14, 1998.

(51) Int. Cl.7 ............................ H04N 7/00; H04N 7/08; H04N 5/50
(52) U.S. Cl. .................. 348/731; 348/731; 348/461; 348/465; 348/569; 348/473; 348/468
(58) Field of Search ................... 348/461, 465, 348/473, 845, 468, 569, 731; 370/73; H04N 7/00, 7/08, 11/00, 5/50

(56) References Cited

U.S. PATENT DOCUMENTS

| | | | |
|---|---|---|---|
| 5,359,601 | * 10/1994 | Wasilewski et al. | 370/73 |
| 5,418,782 | * 5/1995 | Wasilewski | 370/73 |
| 5,579,055 | * 11/1996 | Hamilton et al. | 348/476 |
| 5,600,378 | * 2/1997 | Wasilewski | 348/468 |
| 5,844,478 | * 12/1998 | Blatter et al. | 348/474 |
| 5,844,595 | * 12/1998 | Blatter et al. | 348/12 |
| 5,943,605 | * 8/1998 | Koepele, Jr. | 455/6.2 |
| 5,946,045 | * 8/1999 | Ozkan et al. | 348/467 |
| 5,982,411 | * 11/1999 | Eyer et al. | 348/6 |
| 6,026,164 | * 2/2000 | Sakamoto et al. | 380/10 |
| 6,031,577 | * 2/2000 | Ozkan et al. | 348/465 |
| 6,041,400 | * 3/2000 | Ozcelik et al. | 712/35 |
| 6,115,080 | * 9/2000 | Reitmeier | 348/731 |
| 6,137,539 | * 10/2000 | Lownes et al. | 348/569 |

* cited by examiner

Primary Examiner—Michael Lee
Assistant Examiner—Paulos Natnael
(74) Attorney, Agent, or Firm—Crosby, Heafey, Roach & May

(57) ABSTRACT

Described are methods and apparatuses for tuning television channels that transmit either PSIP Transport Streams or non-PSIP Transport Streams. Specifically, PSIP Transport Streams contain PSIP sections that include a major channel number and minor channel numbers, whereas non-PSIP Transport Streams do not contain such PSIP sections. However, both PSIP and non-PSIP Transport Streams contain PAT sections. Upon receiving a PSIP Transport Stream from a television channel, the present methods and apparatuses directly obtain the major channel number and minor channel numbers from the PSIP section contained in the PSIP Transport Stream. Upon receiving a non-PSIP Transport Stream from a television channel, the present methods and apparatuses form the major channel number and minor channel numbers based on the information contained in the PAT sections. In so doing, the methods and apparatuses can process both PSIP and non-PSIP Transport Streams.

14 Claims, 8 Drawing Sheets

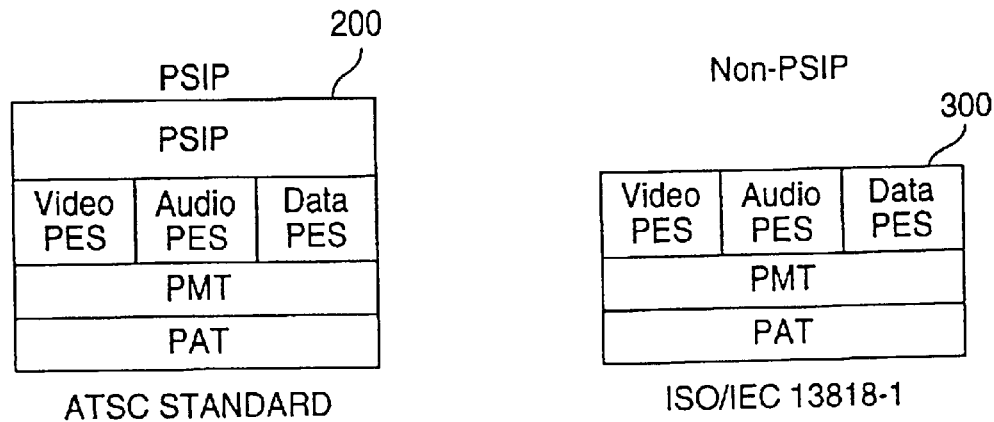
FIG. 2  FIG. 3
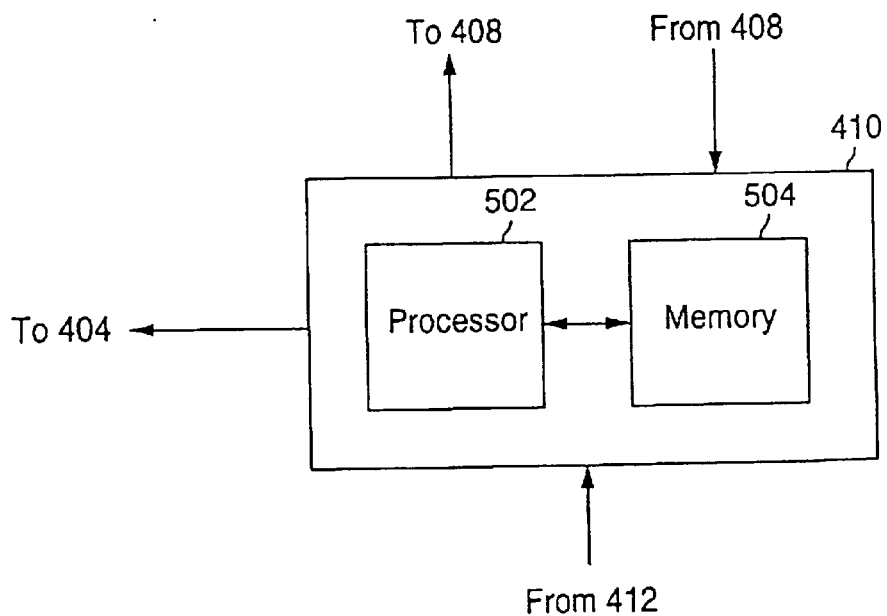
FIG. 5

| Syntax | No. of bits |
|---|---|
| Program_association_section () { | |
|   Table_id | 8 |
|   Section_syntax_indicator | 1 |
|   '0' | 1 |
|   reserved | 2 |
|   section_length | 12 |
|   transport_stream_id | 16 |
|   reserved | 2 |
|   version_number | 5 |
|   current_next_indicator | 1 |
|   section_number | 8 |
|   last_section_number | 8 |
|   for(I=0; I<N; I++) { | |
|     program number | 16 |
|     reserved | 3 |
|     if(program_number=='0') { | |
|       network_PID | 13 |
|     } | |
|     else { | |
|       program map PID | 13 |
|     } | |
|   } | |
|   CRC_32 | 32 |
| } | |

| Syntax | No. of bits |
|---|---|
| TS_program_map_section () { <br>   table_id <br>   Section_syntax_indicator <br>   '0' <br>   reserved <br>   section_length <br>   program_number <br>   reserved <br>   version_number <br>   current_next_indicator <br>   section_number <br>   last_section_number <br>   reserved <br>   PCR PID <br>   Reserved <br>   Program_info_length <br>   For(I=0; I<N; I++) { <br>     Descriptor() <br>   } <br>   for(I=0; I<N1; I++) { <br>     stream type <br>     reserved <br>     elementary PID <br><br>     reserved <br>     ES_info_length <br>     For(I=0; I<N2; I++) { <br>       Descriptor() <br>     } <br>   } <br><br>   CRC_32 <br> } | 8 <br> 1 <br> 1 <br> 2 <br> 12 <br> 16 <br> 2 <br> 5 <br> 1 <br> 8 <br> 8 <br> 3 <br> 13 <br> 4 <br> 12 <br><br><br><br> 8 <br> 3 <br> 13 <br><br> 4 <br> 12 <br><br><br><br><br> 32 |

FIG. 8

AUTOMATIC PSIP DETECTION SYSTEM AND METHOD

CROSS-REFERENCE

This application is a continuation of the provisional application 60/104,219, filed on Oct. 14, 1994, entitled AUTOMATIC PSIP DETECTION SYSTEM AND METHOD by the same inventor.

BACKGROUND OF THE INVENTION

1. Field of the Invention

This invention relates generally to tuning transmission channels and, more specifically, to a method and apparatus for tuning television channels that transmit PSIP (Program and System Information Protocol) Transport Streams and non-PSIP Transport Streams.

2. Related Art

It is known that broadcasters can transmit television programs through a broad-band frequency spectrum of RF (radio frequency). The broad-band frequency spectrum is divided into many sub-band frequency spectrums. A unique number is assigned to identify each of the sub-band frequency spectrums. A sub-band frequency spectrum with a unique number is defined as a physical channel. A physical channel can be used to implement an analog channel, or one or more digital channels. Thus, a particular broadcaster can use one or more physical channels to transmit its television programs.

FIG. 1 shows exemplary channel configurations within a broad-band frequency spectrum 102. As shown in FIG. 1, the broad-band frequency spectrum 102 is divided into 38 physical channels numbered from 2 to 39.

According to PSIP protocol, a virtual channel is the designation, usually a number, used as the single entity that provides access to an analog television program or a set of one or more digital elementary streams. It is called "virtual" because its identification may be defined independently from its physical channel identification. Exemplary configurations of virtual channels are: a digital radio channel (audio only), a typical analog television channel, a typical digital television channel (composed of one audio and one video stream), multi-visual digital channels (composed of one or more data streams). According to PSIP protocol, each virtual channel is associated with a major channel number and a minor channel number.

As shown in FIG. 1, an analog channel 3 links to the physical channel 3, an analog channel 4 links to the physical channel 4, two digital channels 4.1 and 4.2 link to the physical channel 38, and two digital channels 6.1 and 6.2 link to physical channel 39. The physical channels as shown in FIG. 1 are configured into three groups. In group 1, the physical channel 3 is licensed to a first broadcast organization. In group 2, the physical channel channels 4 and 38 are licensed to a second broadcast organization. In group 3, the physical channel 39 is licensed to a third broadcast organization.

At the user side, number 3 designates an analog channel for the first broadcast organization. Number 4 designates a major channel (4) for the second broadcast organization, and the numbers 1 and 2 designate two minor channels (4.1 and 4.2), respectively, for the second broadcast organization. The number 6 designates a major channel (6) for the third broadcast organization, and the numbers 1 and 2 designate the two minor channels (6.1 and 6.2) for the third broadcast organization.

As shown in FIG. 1, if a channel group includes analog and digital channels, number 0 is used in minor channel number position to designate the analog channel. For example, analog channel 4 is designated as 4.0. However, if a channel group includes only an analog channel, number 0 will not be used to designate any channel. For example, analog channel 3 is designated as 3, not 3.0.

FIG. 2 shows a packet 200 in a PSIP Transport Stream (TS) according to the ATSC (Advanced Television System Committee) standard. There are two formats of data in the PSIP packet 200. One is called PES (Packetized Elementary Stream) format. Video, audio, and data are packed in PES format. The other is called Section format defined by ISO/IEC 13818-1 standard. PAT (Program Association Table), PMT (Program Mat Table), and PSIP sections are packed in Section format.

A PAT section contains a list of PIDs (Packet Identifiers) to a set of PMTs. A PMT section includes PIDs to audio, video, and data PESes that form a particular television program. A Transport Stream contains many packets. Each of the packets has a PID in its header, and this PID is used for collecting and recovering PES and Section data.

The PSIP section contains a plurality of tables, including STT (System Time Table), MGT (Master Guide Table), VCT (Virtual Channel Table), RRT (Rating Region Table), EIT (Event Information Table), and ETT (Extended Text Table). These tables are defined by Program and System Information Protocol published by the Advanced Television Systems Committee on Dec. 23, 1997. Specifically, the PSIP section contains the information regarding program title, a major channel number, and minor channel number(s). The PSIP protocol is hereby incorporated into the present application by reference.

FIG. 3 shows a packet 300 in a non-PSIP Transport Stream according to ISO/IEC 1318-1 Standard (ISO stands for International Standard Organization, and IEC for International Electrotechnical Commission). As shown in FIG. 3, the packet 300 has a similar structure as that of the packet 200, except that the packet 200 does not have a PSIP section. The ISO/IEC 1318-1 Standard is hereby incorporated into the present application by reference.

As described above, the PSIP section in the PSIP packet 200 contains a major channel number and minor channel number(s). Thus, upon receiving a PSIP Transport Stream, a television set can display a major channel number and a minor channel number to identify the channel selected, based on the information in the PSIP section. However, a non-PSIP Transport Stream does not contain a major channel number and minor channel number(s), because it does not have any PSIP sections.

There is, therefore, a need to provide a method and apparatus for tuning transmission channels that transmits either PSIP Transport Streams or non-PSIP Transport Streams.

There is another need to provide a method and apparatus for tuning transmission channels that transmit either PSIP Transport Streams or non-PSIP Transport Streams without using different user hardware and software interfaces.

The present invention provides the methods and apparatuses to meet these two needs.

SUMMARY OF THE INVENTION

To overcome the shortcomings in the available art, the present invention provides a novel method for tunning television channels that transmit signal streams.

In one aspect, the present invention provides a method for tunning transmission channels that transmit either PSIP signal streams or non-PSIP signal streams. The method comprises the steps of: (a) receiving a channel selection signal for indicating a selected channel; (b) receiving a signal stream from the selected channel; (c) determining whether the signal stream is a PSIP signal stream or a non-PSIP signal stream; (d) processing the signal stream using a PSIP process, if the signal stream is a PSIP signal stream; and (e) processing the signal stream using a non-PSIP process, if the signal stream is a non-PSIP signal stream.

The present invention also provides an apparatus for performing the steps in the method discussed above.

BRIEF DESCRIPTION OF THE DRAWINGS

The foregoing and other objectives, features and advantages of the invention will be more readily understood upon consideration of the following detailed description of certain preferred embodiments of the invention, taken in conjunction with the accompanying drawings.

FIG. 2 shows a packet in a PSIP Transport Stream;

FIG. 3 shows a packet in a non-PSIP Transport Stream;

FIG. 5 shows some components in the control circuit shown in FIG. 4;

FIG. 8 shows a PMT section in greater detail;

DETAILED DESCRIPTION OF THE PREFERRED EMBODIMENT

The present invention provides a novel method and apparatus for tuning transmission channels that transmit either PSIP Transport Streams or non-PSIP Transport Streams.

Figure 1:
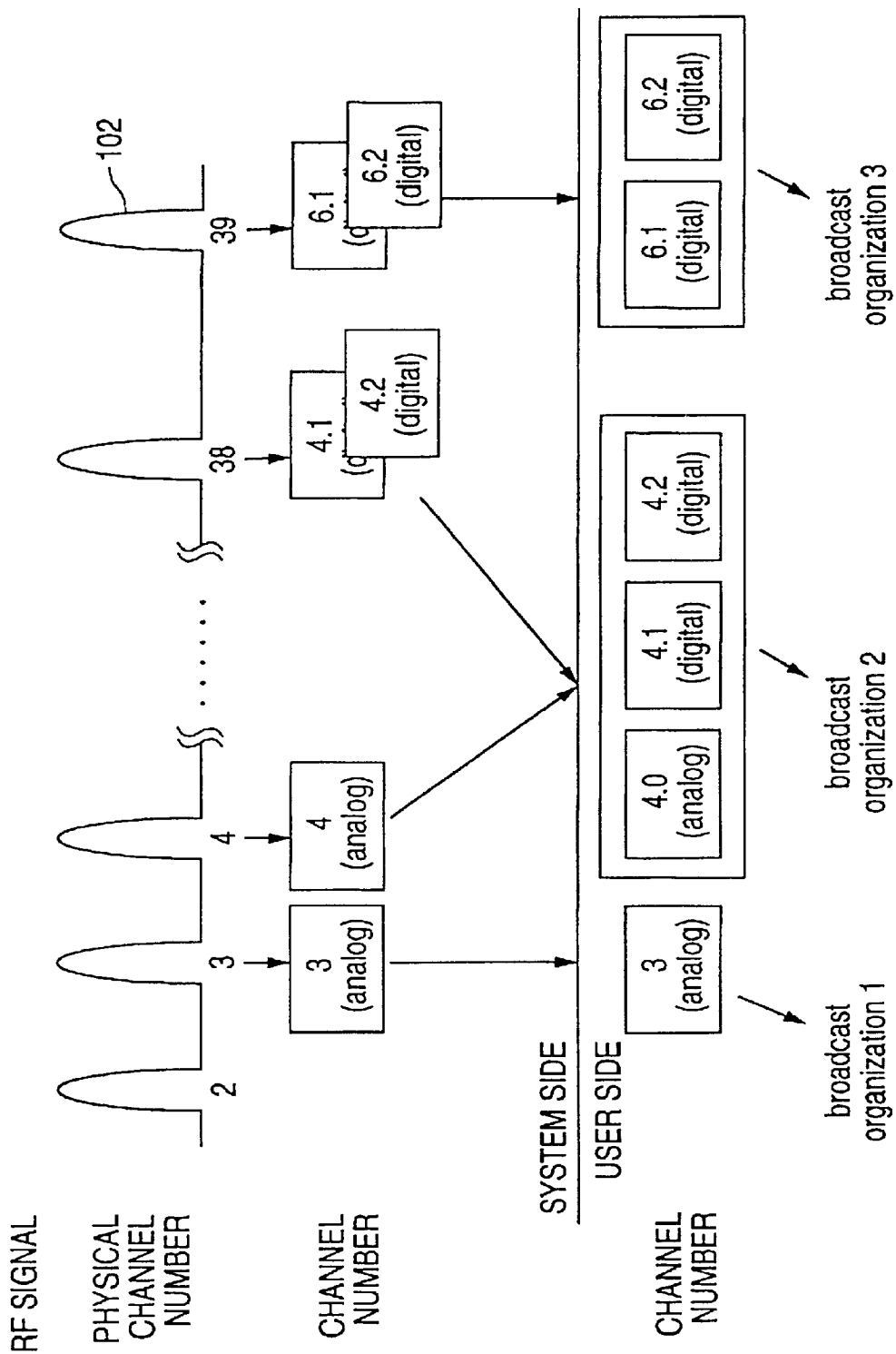
FIG. 1 shows exemplary channel configurations within a broad-band frequency spectrum.
Figure 4:
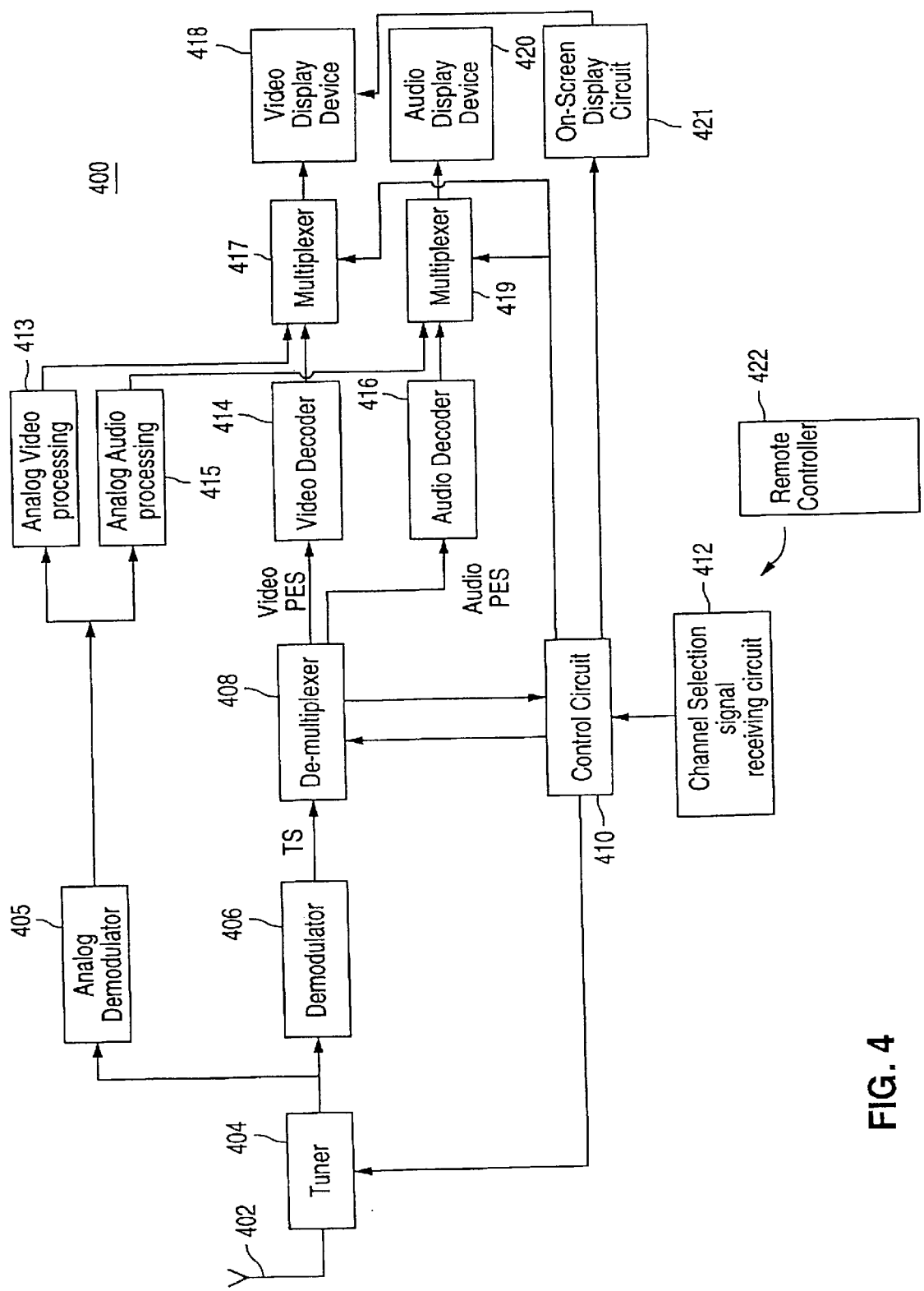
FIG. 4 shows a block diagram of a television set 400, which can tune transmission channels in accordance with the present invention.

FIG. 4 shows a block diagram for a television set 400, which can tune transmission channels in accordance with the present invention.

As shown in FIG. 4, the television set 400 includes a tuner 404 coupled to an antenna 402; an analog demodulator 405 and a digital demodulator 406 that are coupled to the tuner 404; a de-multiplexer 408 coupled to the demodulator 406; a control circuit 410 coupled to the tuner 404 and the de-multiplexer 408; a channel selection signal receiving circuit 412 and an on-screen display circuit 421 that are coupled to the control circuit 410; an analog video processing circuit 413 and an analog audio processing circuit 415 that are coupled to the analog demodulator 405; a video decoder 414 and an audio decoder 416 that are coupled to the de-multiplexer 408; a multiplexer 417 that is coupled to the analog video processing circuit 413 and the video decoder 414; a multiplexer 419 that is coupled to the analog audio processing circuit 415 and the audio decoder 416; and a video display device 418 that is coupled to the multiplexer 417 and the on-screen display circuit 421; and an audio reproduction device 420 coupled to the multiplexer 419. The television set 400 also includes a remote controller 422 for remotely communicating with the channel selection signal receiving circuit 412.

The tuner 404 can be tuned to a particular sub-band frequency spectrum for a physical channel, corresponding to a channel selection at the television set 400. In the present invention, the tuner 404 can perform both analog and digital tunning.

The analog demodulator 405 demodulates analog signals carried in the physical channel selected by the tuner 404. The digital demodulator 406 demodulates digital signals (i.e. Transport Streams) carried in the physical channel selected by the tuner 404.

The de-multiplexer 408 receives the demodulated Transport Stream, collects the Section data in the Transport Stream, and sends the Section data to the control circuit 410, which in turn stores the Section data in a memory 504 of the control circuit 410 (see FIG. 5). In addition, the de-multiplexer recovers the PES data relating to a particular program from the demodulated Transport Streams and sends the PES data to the video decoder 414, and the audio decoder 416. More specifically, the control circuit 410 sets a PID into the de-multiplexer 408, and the de-multiplexer 408 collects the packets identified by the PID. Based on the PID, the de-multiplexer 408 further recovers video PESes and audio PESes.

The control circuit 410 controls the operation of the television set 400.

The analog video processing circuit 413 processes the demodulated analog signals received from the analog demodulator 405. The video decoder 414 decodes the video PESes received from the de-multiplexer 408.

The analog audio processing circuit 415 processes the demodulated audio signals received from the analog demodulator 405. The audio decoder 416 decodes the audio PESes received from the de-multiplexer 408.

Under the control of the control circuit 410, the multiplexer 417 selectively connects the analog video processing circuit 413 and video decoder 414 to the video display device 418.

Under the control of the control circuit 410, the multiplexer 419 selectively connects the analog audio processing circuit 415 and the audio decoder 416 to the audio reproduction device 420.

The on-screen display circuit 421 receives the control signals indicating the channel numbers from the control circuit 410 and causes them to be displayed on the video display device 418.

The video display device 418 (such as a television screen) displays the video signals received from the multiplexer 417. The video display device 418 also displays channel numbers received from the on-screen display circuit 421.

The audio reproduction device 420 (such as a speaker) outputs the audio signals received from the multiplexer 419.

FIG. 5 shows some components in the control circuit 410 in FIG. 4. As shown in FIG. 5, the control circuit 410 includes a processor 502 and a memory 504. The memory 504 stores an application program, and the processor 502 executes the application program to perform the channel tuning process in accordance with the present invention.

Figure 6:
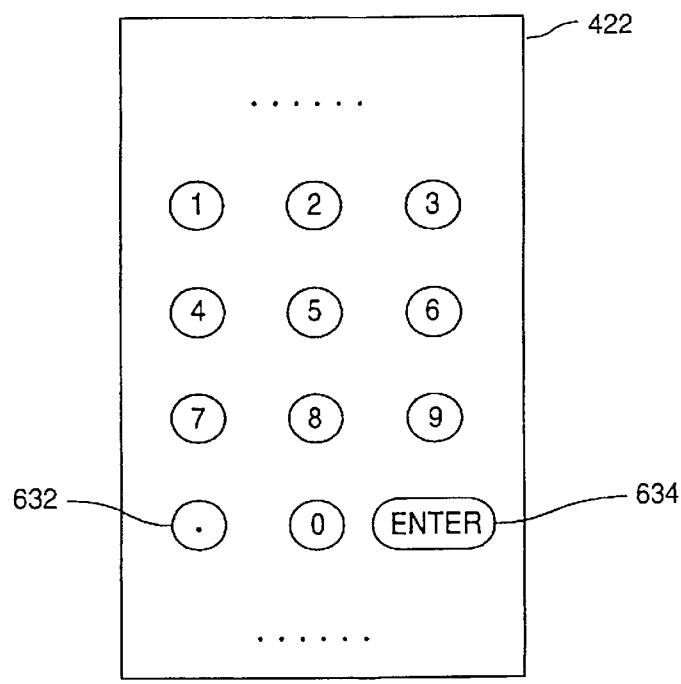
FIG. 6 shows some components in the remote controller shown in FIG. 4.

FIG. 6 shows some components in the remote controller 422. As shown in FIG. 6, the remote controller 422 contains ten numeric keys (0, 1, . . . , 9), a dot "." key 632, and an ENTER key 634. The ten numeric keys can be used to select channels, the dot key 632 can be used to indicate a minor channel input, and the ENTER key can be used to indicate the completion of channel selection. In response to a channel selection using the keys by a user, the remote controller 422 sends a channel selection signal to the control circuit 410 via the channel selection signal receiving circuit 412.

Figures 7, 9:
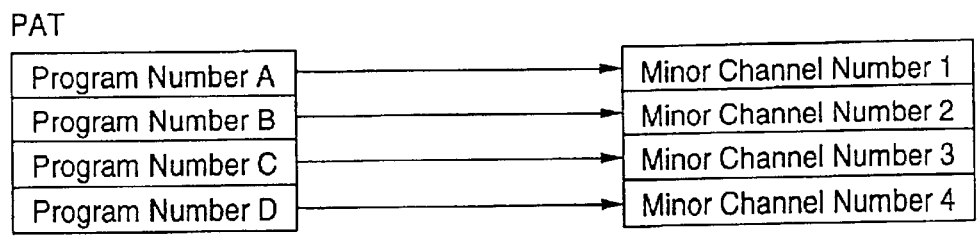
FIG. 7 shows a PAT section in greater detail.
FIG. 9 shows a scheme of assigning four minor channel numbers to four programs in a non-PSIP Transport Stream, in accordance with the present invention.

FIG. 7 shows a PAT section in greater detail. In FIG. 7, the section_length indicates the total byte length for the parameters below it in the PAT section. Specifically, these parameters include transport_stream_id, reserved, version_number, current_next_indicator, section_number, last_section_number, the three parameters within the loop (i.e. "for(I=0; I<N; I++)"), and CRC in the PAT section. In a PAT section, the byte length for the three parameters within the loop (i.e. Program_number, reserved, and network_PID) varies (4×N bytes), depending on the number (N) of programs in the PAT section. However, the byte length for the parameters outside the loop (i.e. transport_stream_id, reserved, version_number, current_next_indicator, section_number, last_section_number, and CRC) is fixed. Thus, the byte length for the three parameters within the loop can be derived from section_length. For example, if section_length is 25, the byte length for the three parameters within the loop will be (section_length—transport_stream_id —reserved—version_number—current_next_indicator—section_number— last_section_number—CRC)=[25 bytes–(16 bits+2 bits+5 bits+1 bit+8 bits+8 bits)–4 bytes]=[25 bytes–40 bits–4 bytes]=[25 bytes–5 bytes–4 bytes]=16 bytes. Thus, the number of programs can be in turn derived from the byte length for the parameters within the loop, that is, the number (N) of programs=16 bytes/4 bytes=4 programs. The present invention assigns a number (starting from 1) to each of the programs contained in a PAT section.

FIG. 8 shows a PMT section in greater detail. As shown in FIG. 8, the PMT contains PCR (Program Clock Reference), video PID, and audio PID.

FIG. 9 shows a scheme of assigning four minor channel numbers to four programs (A, B, C, and D) in a non-PSIP Transport Stream, in accordance with the present invention.

In the present invention, the physical channel number that transmits the Transport Stream is used as the major channel number for a non-PSIP Transport Stream. Assuming that the physical channel 8 is used to transmit the Transport Stream, the four programs shown in FIG. 9 have the following major and minor channel number assignments:

Program A: 8.1;
Program B: 8.2;
Program C: 8.3; and
Program D: 8.4.

Figure 10:
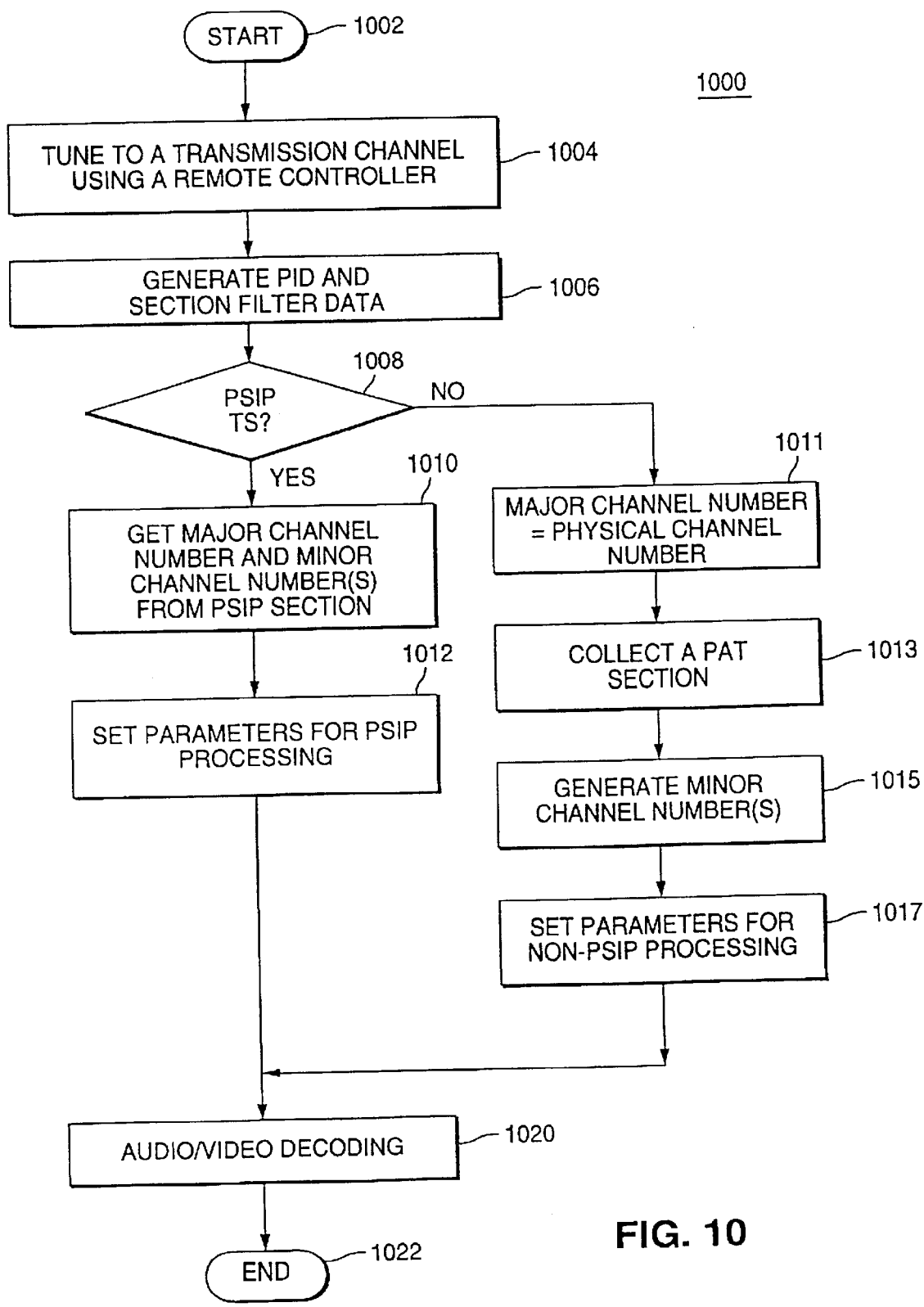
FIG. 10 shows a process of tuning a channel, in accordance with the present invention.

FIG. 10 shows a flowchart 1000 illustrating a process of tuning a channel, in accordance with the present invention.

At step 1004, a user selects a particular channel at a television set by pressing the keys on the remote controller 422, which in turn remotely sends a channel selection signal to the channel selection signal receiving circuit 412. Upon receiving the channel selection signal, the channel selection signal receiving circuit 412 sends it to the control circuit 410, which in turn sets the tuner 404 to receive the signals transmitted via a physical channel selected by the user.

At step 1006, the control circuit 410 generates a PID and section filter data, and sets the PID and section filter data for the de-multiplexer 408 to collect VCT section data. In response, the de-multiplexer 408 attempts to collect the VCT section data identified by the PID, and sends the collected VCT section data to the control circuit 410 if any of the VCT sections can be collected. The PID number and the section filter data can be pre-assigned and retrieved from the memory 504.

At step 1008, the control circuit 410 determines whether the Transport Stream received from the selected channel is a PSIP Transport Stream or a non-PSIP Transport Stream. According to ATSC standard A/65, a broadcaster that transmits PSIP Transport Streams must send a VCT section in every 400 ms. Thus, if the control circuit 410 detects a VCT section in each 400 ms period of time, the incoming Transport Stream is a PSIP Transport Stream; if the control circuit cannot detects a VCT section within a 400 ms period of time, the incoming Transport Stream is a non-PSIP Transport Stream. When the control circuit 410 determines that the incoming Transport Stream is a non-PSIP Transport Stream, the operation is led to step 1011; when the control circuit 410 determines that the incoming Transport Stream is a PSIP Transport Stream, the operation is led to step 1010.

At step 1010, the control circuit 410 gets major channel number and minor channel number(s) from PSIP section sent by the de-multiplexer 408. The major channel number and minor channel number(s) will be reproduced, together with audio and video, on the television set.

At step 1012, the control circuit 410 sets the parameters in the de-multiplexer 408 for PSIP processing. The PSIP parameters include PCR (Program Clock Reference) PID, video PID and audio PID. The operation is then led to step 1020.

When step 1008 determines that the incoming Transport Stream is a non-PSIP Transport Stream, at step 1011, the control circuit 410 uses the physical channel number as the major channel number for the incoming Transport Stream.

At step 1013, the de-multiplexer 408 collects a PAT section identified by the PID which was set by the control circuit 410, and sends the PAT section to the control circuit 410.

At step 1015, the control circuit 410 generates minor channel numbers for the programs carried in the incoming Transport Stream based on the section data in the PAT section, by using the process described in connection with FIG. 9.

At step 1017, the control circuit 410 sets parameters in the de-multiplexer 408 for non-PSIP processing. The non-PSIP processing parameters include PCR PID, video PID, and audio PID. These parameters can be obtained from the PMT section.

At step 1020, the de-multiplexer 408 collects the video and audio PESes for the selected program and sends them to the video and audio decoders 414 and 416, where the video and audio PESes are decoded, respectively.

Figure 11:
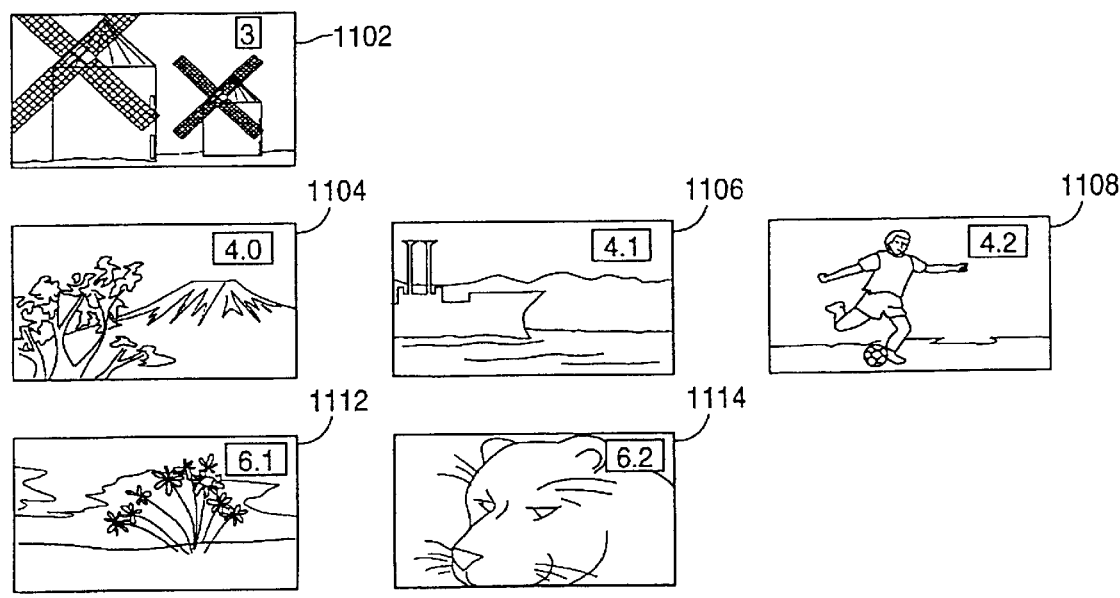
FIG. 11 shows a plurality of screens that display programs carried in different channels.

FIG. 11 shows a plurality of screens that display the programs carried in different channels. As shown in FIG. 11, the screen 1102 displays a program that is received from an analog channel 3. The screens 1104, 1106, and 1108 display the programs that are received from a major channel 4 that contains one analog channel 4.0 and two digital channels 4.1 and 4.2. The screens 1112 and 1114 display the programs that are received from a major channel 6 that contains two digital channels 6.1 and 6.2. In FIG. 11, the analog channel 3 transmits only analog signal streams, the major channel 4 transmits only PSIP Transport Streams, and the major channel 6 transmits only non-PSIP Transport Streams.

Figure 12:
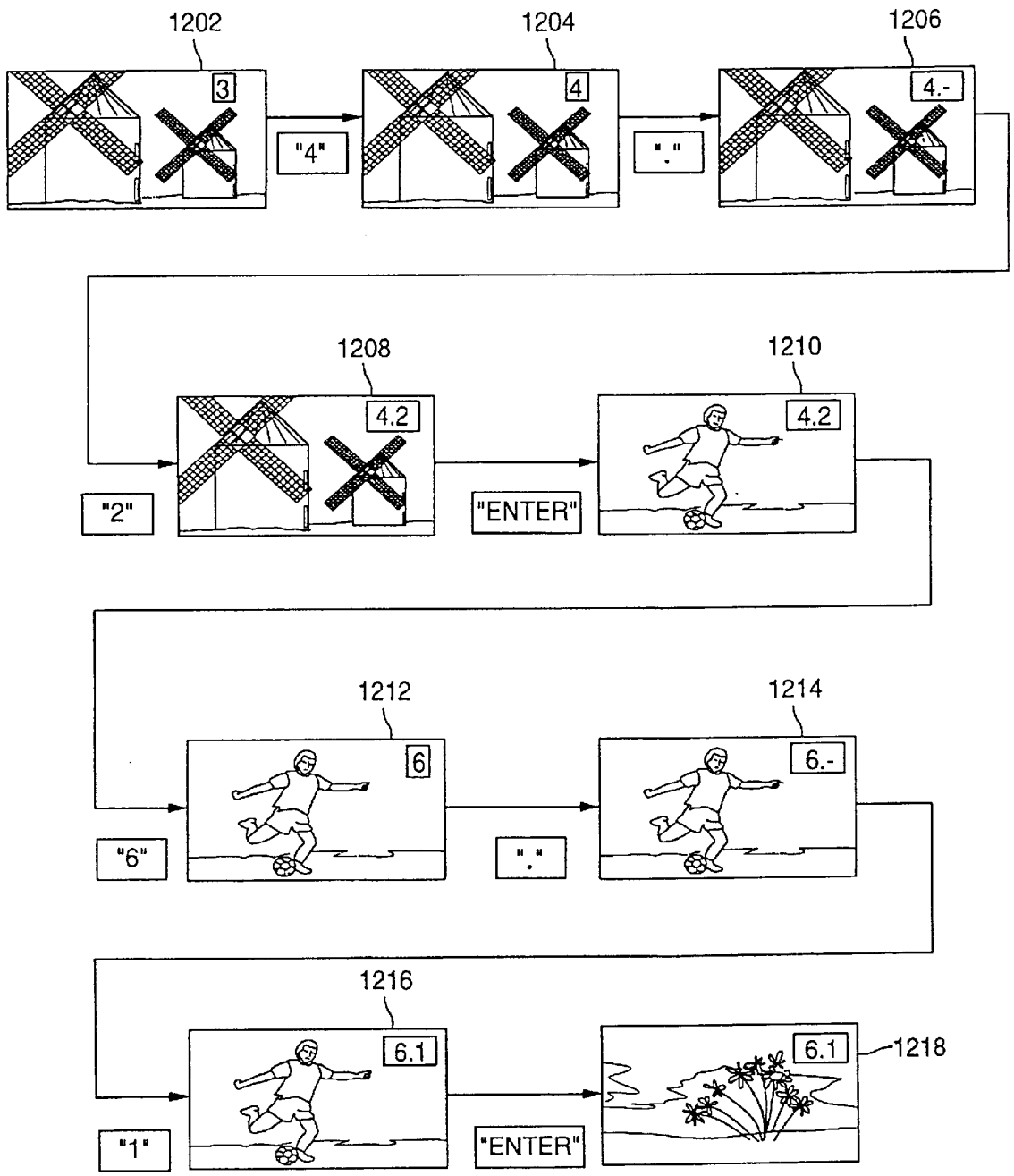
FIG. 12 shows a sequence of screen displays at a television set to illustrate channel selections by a user, in accordance with the present invention.

FIG. 12 shows a sequence of screen displays at a television set to illustrate channel selections by a user, in accordance with the present invention:

Screen 1204:

As shown in the screen 1202, the television set is initially displaying the program received from the analog channel 3. To select major channel 4, a user presses the "4" key on the remote controller 422. In response, the remote controller 422 sends a channel selection signal to the control circuit 410 via the channel selection signal receiving circuit 412, and the control circuit 410 sends a control signal to the on-screen display circuit 421, which in turn sends the number "4" to the video decoder 414. The video decoder 414 then displays the number "4" as a major channel number on the television set as shown in the screen 1204.

Screen 1206:

To input a minor channel number, the user presses the dot "." key on the remote controller 422. In response, the remote controller 422 sends a channel selection signal to the control circuit 410 via the channel selection signal receiving circuit 412, and the control circuit 410 sends a control signal to the on-screen display circuit 421, which in turn sends the dot "." and dash "-" symbols to the video decoder 414. The video decoder then displays the dot "." and dash "-" symbols on the television set as shown in the screen 1206. The dash "-" symbol is displayed after the dot "." symbol to prompt the user to input a minor channel number.

Screen 1208:

To select a minor channel 2, the user presses the "2" key on the remote controller 422. In response, the remote controller 422 sends a channel selection signal to the control circuit 410 via the channel selection signal receiving circuit 410, and the control circuit 410 sends a control signal to the on-screen display circuit 421, which in turn sends the number "2" to the video decoder 414. The video decoder 414 then displays the number "2" as a minor channel number on the television set as shown in the screen 1208.

Screen 1210:

To switch to channel 4.2, the user presses the "Enter" key on the remote controller 422. In response, the remote controller 422 sends a channel selection completion signal to the control circuit 410 via the channel selection signal receiving circuit 412. Upon receiving the channel selection completion signal, the control circuit 410 starts a channel tuning process as shown in FIG. 10. Consequently, the de-multiplexer 408 selects the program transmitted via the channel 4.2, and the video display device 418 displays the program on the television set as shown in the screen 1210.

Screen 1212:

To select the major channel 6, a user presses the "6" key on the remote controller 422. In response, the remote controller 422 sends a channel selection signal to the control circuit 410 via the channel selection signal receiving circuit 412, and the control circuit 410 sends a control signal to the on-screen display circuit 421, which in turn sends the number "6" to the video decoder 414. The video decoder 414 then displays the number "6" as a major channel number on the television set as shown in the screen 1212.

Screen 1214:

To input a minor channel number, the user presses the dot "." key on the remote controller 422. In response, the remote controller 422 sends a channel selection signal to the control circuit 410 via the channel selection signal receiving circuit 412, and the control circuit 410 sends a control signal to the on-screen display circuit 421, which in turn sends the dot "." and dash "-" symbols to the video decoder 414. The video decoder then displays the dot "." and dash "-" symbols on the television set as shown in the screen 1214. The dash "-" symbol is displayed after the dot "." symbol to prompt the user to input a minor channel number.

Screen 1216:

To select the minor channel 1, the user presses the "1" key on the remote controller 422. In response, the remote controller 422 sends a channel selection signal to the control circuit 410 via the channel selection signal receiving circuit 410, and the control circuit 410 sends a control signal to the on-screen display circuit 421, which in turn sends the number "1" to the video decoder 414. The video decoder 414 then displays the number "1" as a minor channel number on the television set as shown in the screen 1216.

Screen 1218:

To switch to channel 6.1, the user presses the "Enter" key on the remote controller 422. In response, the remote controller 422 sends a channel selection completion signal to the control circuit 410 via the channel selection signal receiving circuit 412. Upon receiving the channel selection completion signal, the control circuit 410 starts a channel tuning process as shown in FIG. 10. Consequently, the de-multiplexer 408 selects the program transmitted via the channel 6.1, and the video display device 418 displays the program on the television set as shown in the screen 1218.

In the present invention, the application program to perform the steps shown in FIG. 10 can be stored in the memory 504, and executed by the processor 502.

It should be noted that the user interface shown in FIG. 12 and the remote controller shown in FIG. 6 can be used to tune the channels that transmit either the PSIP Transport Stream or the non-PSIP Transport Stream.

Although the present invention has been shown and described with respect to preferred embodiments, various changes and modifications are deemed to lie within the sprit and scope of the invention as claimed. The corresponding structures, materials, acts, and equivalents of all means or step plus function elements in the claims which follow are intended to include any structure, material, or acts for performing the functions in combinations with other claimed elements as specifically claimed.

What is claimed is:

1. A method for tuning transmission channels that transmit either PSIP signal streams or non-PSIP signal streams, comprising the steps of:

(a) receiving a channel selection signal for indicating a selected channel;

(b) receiving a signal stream from the selected channel;

(c) determining whether the signal stream is a PSIP signal stream or a non-PSIP signal stream;

(d) processing the signal stream using a PSIP process, if the signal stream is a PSIP signal stream; and (e) processing the signal stream using a non-PSIP process, if the signal stream is a non-PSIP signal stream.

2. The method of claim 1, wherein the step (c) determines the PSIP signal stream and the non-PSIP signal stream by detecting whether the signal stream contains a VCT section.

3. The method of claim 1, wherein the step (d) obtains a major channel number and at least one minor channel number contained in the signal stream, if the signal stream is a PSIP signal stream.

4. The method of claim 3, wherein the step (e) forms a major channel number and at least one minor channel number, if the signal stream is a non-PSIP signal stream.

5. The method of claim 4, wherein the step (e) uses a physical channel number as the major number.

6. The method of claim 5, wherein the non-PSIP signal stream contains a PAT section, and the step (e) forms at least one minor channel number using information contained in the PAT section.

7. An apparatus for tuning transmission channels that transmit either PSIP signal streams or non-PSIP signal streams, comprising:

(a) means for receiving a channel selection signal for indicating a selected channel;

(b) means for receiving a signal stream from the selected channel;

(c) means for determining whether the signal stream is a PSIP signal stream or a non-PSIP signal stream;

(d) means for processing the signal stream using a PSIP process, if the signal stream is a PSIP signal stream; and (e) means for processing the signal stream using a non-PSIP process, if the signal stream is a non-PSIP signal stream.

8. The apparatus of claim 7, wherein the determining means determines the PSIP signal stream and the non-PSIP signal stream by detecting whether the signal stream contains a VCT section.

9. The apparatus of claim 7, wherein the processing means (d) obtains a major channel number and at least one minor channel number contained in the signal stream, if the signal stream is a PSIP signal stream.

10. The apparatus of claim 9, wherein the processing means (e) forms a major channel number and at least one minor channel number, if the signal stream is a non-PSIP signal stream.

11. The apparatus of claim 10, wherein the processing means (e) uses a physical channel number as the major number.

12. The apparatus of claim 11, wherein the non-PSIP signal stream contains a PAT section, and the processing means (e) forms at least one minor channel number using information contained in the PAT section.

13. A method for tuning transmission channels that transmit either PSIP signal streams or non-PSIP signal streams, comprising the steps of:

(a) receiving a channel selection signal for indicating a selected channel;

(b) receiving a signal stream from the selected channel;

(c) determining whether the signal stream is a PSIP signal stream or a non-PSIP signal stream by detecting whether the signal stream contains a VCT section;

(d) processing the signal stream using a PSIP process, if the signal stream is a PSIP signal stream and obtains a major channel number and at least one minor channel number contained in the signal stream, if the signal stream is a PSIP signal stream; and (e) processing the signal stream using a non-PSIP process, if the signal stream is a non-PSIP signal stream, forms a major channel number and at least one minor channel number, if the signal stream is a non-PSIP signal stream, uses a physical channel number as the major number; and forms at least one minor channel number using information contained in the PAT section.

14. An apparatus for tuning transmission channels that transmit either PSIP signal streams or non-PSIP signal streams, comprising:

(a) means for receiving a channel selection signal for indicating a selected channel;

(b) means for receiving a signal stream from the selected channel;

(c) means for determining whether the signal stream is a PSIP signal stream or a non-PSIP signal stream by detecting whether the signal stream contains a VCT section;

(d) means for processing the signal stream using a PSIP process, if the signal stream is a PSIP signal stream and obtains a major channel number and at least one minor channel number contained in the signal stream, if the signal stream is a PSIP signal stream; and (e) means for processing the signal stream using a non-PSIP process, if the signal stream is a non-PSIP signal stream, forms a major channel number and at least one minor channel number, if the signal stream is a non-PSIP signal stream, uses a physical channel number as the major number; and forms at least one minor channel number using information contained in the PAT section.

* * * * *